United States Patent [19]

Vermilion et al.

[11] 4,341,674

[45] Jul. 27, 1982

[54] COMPOSITION FOR IMPREGNATING GLASS FIBER CORDS FOR REINFORCING ELASTOMERIC PRODUCTS

[75] Inventors: Donn R. Vermilion; Donald J. Hammond, both of Newark, Ohio

[73] Assignee: Owens-Corning Fiberglas Corporation, Toledo, Ohio

[21] Appl. No.: 211,596

[22] Filed: Dec. 1, 1980

[51] Int. Cl.³ .............................................. C08L 91/08
[52] U.S. Cl. ................................... 524/156; 428/378; 524/161; 524/166; 524/510
[58] Field of Search ........................ 260/28.5 B, 28 P; 428/378; 65/3 C

[56] References Cited

U.S. PATENT DOCUMENTS 3,726,824 4/1973 Saunders et al. ........... 260/29.7 EM
4,107,117 8/1978 Lin et al. ......................... 260/28.5 B

*Primary Examiner*—Theodore E. Pertilla
*Attorney, Agent, or Firm*—Ronald C. Hudgens; Philip R. Cloutier; James B. Wilkens

[57] ABSTRACT

An improved aqueous composition for impregnating multifilament glass strand comprises emulsified polybutadiene homopolymer, butadiene-styrene-vinylpyridine terpolymer, resorcinol-formaldehyde resin, emulsified wax, a thickening agent and a defoaming agent with the homopolymer and the terpolymer emulsified with a synthetic anionic surfactant having sulfate, sulfonate or sulfosuccinate groups.

10 Claims, No Drawings

COMPOSITION FOR IMPREGNATING GLASS FIBER CORDS FOR REINFORCING ELASTOMERIC PRODUCTS

TECHNICAL FIELD

This invention relates to compositions for impregnating multifilament glass fiber strands or cords to be used for reinforcing elastomeric products such as pneumatic tires, hoses, belts, etc.

BACKGROUND ART

Multifilament glass fiber strands or cords are known to have advantageous characteristics for reinforcing elastomeric products such as pneumatic tires, hoses, belts, etc. However, it has been found that these advantageous characteristics can only be practically realized when the strands or cords have been impregnated with a suitable polymeric or resinous material (impregnant) which largely fills the interstices between the individual filaments in each strand or cord and also largely coats the outer surface of the strand or cord. When so disposed, a suitable impregnant appears to bind the individual filaments of each cord together into an integral unit, to provide adhesion of the cord to the elastomeric matrix in which it (or fabric woven therefrom) is embedded as reinforcement, and also to furnish a cushioning medium flexibly separating the individual filaments in each strand or cord from one another so as to permit at least a modest amount of relative motion between such filaments during normal deformations of the elastomeric products reinforced with such impregnated cord while minimizing mutual abrasion of the filaments during such relative motion. Ordinarily, and preferably, the individual glass fibers will have been very lightly coated immediately upon formation with a suitable sizing composition comprising a film-forming resin or polymer, a lubricant and a coupling agent in order to protect them from abrasion during subsequent handling and to enhance the adhesion of the impregnant to the individual filaments.

The most satisfactory impregnating compositions heretofore known for glass fiber cords to be used in the reinforcing belts for radial pneumatic tires have been aqueous compositions comprising polybutadiene homopolymer latex, butadiene-styrene-vinylpyridine terpolymer latex, a resorcinol-formaldehyde resin, a wax emulsion, a thickening agent containing polymerized methacrylic acid and a defoaming agent comprising a suitable blend of emulsifiable mineral oils, silica derivatives and esters. Such impregnating compositions and the impregnated cords produced therewith are described in U.S. Pat. Nos. 4,060,658 entitled Glass Fibers Coated With A Polybutadiene Homopolymer Latex-Containing Impregnant, issued to Lin and Hammond on Nov. 29, 1977, and 4,107,117 entitled Tire Cord Impregnant, issued to Lin and Hammond on Aug. 15, 1978, both of which are incorporated herein by reference. Since it was not previously recognized that the nature of the emulsifying surfactant used for the polymer latex components of these impregnating compositions had any significant effect on the properties of the impregnated cord, the nature of those surfactants was not indicated in these two patents, but in fact anionic rosinate surfactants have heretofore been employed for emulsifying the polybutadiene homopolymers and the butadiene-styrene-vinylpyridine terpolymers of such impregnating compositions.

DISCLOSURE OF THE INVENTION AND OF THE BEST MODE FOR CARRYING IT OUT

We have now found that impregnating compositions of the type hereinabove described as most satisfactory for producing reinforcing belts for radial tires can be even further improved if the polybutadiene homopolymer and the butadiene-styrene-vinylpyridine terpolymer are emulsified with synthetic anionic surfactants having sulfate, sulfonate or sulfosuccinate groups. In particular, the rub-off of dried impregnant from the impregnated tire cord during winding, weaving, etc., can be significantly reduced while retaining desirably low tackiness and also either substantially retaining or even improving performace characteristics in tires fabricated using such cord in the belts thereof.

In one of its aspects, the invention is an improved aqueous composition for impregnating multifilament glass strand with an elastomer-compatible impregnant, said aqueous composition comprising emulsified polybutadiene homopolymer, emulsified butadiene-styrene-vinylpyridine terpolymer, resorcinol-formaldehyde resin, emulsified wax, a thickening agent and a defoaming agent, the improvement for reducing rub-off of said impregnant from said strand impregnated therewith, while retaining desirably low tackiness of said impregnant, comprising employing synthetic anionic surfactant having sulfate, sulfonate or sulfosuccinate groups as emulsifying agent for said homopolymer and for said terpolymer.

In another of its aspects, the invention is an improved method for impregnating multifilament glass fiber strand with elastomer-compatible impregnant by immersing the strand in a body of this aqueous impregnating composition to substantially saturate the strand therewith and then heating the saturated strand to substantially remove the water therefrom and at least partially cure the residue thereof. In yet another of its aspects, the invention is the improved elastomer-compatible impregnated strand wherein the impregnant comprises the dried and at least partially cured residue of the aqueous impregnating composition of this invention.

The polybutadiene homopolymer can be introduced into the composition as an aqueous latex emulsified with a synthetic anionic surfactant having sulfonate or sulfosuccinate groups. Ordinarily such latex will contain about 40 to 60 percent by weight non-volatile material and preferably the emulsified homopolymer therein will have been formed by emulsion polymerization. Preferably, the gel content of the homopolymer will be at least about 60 percent by weight thereof and also preferably not greater than about 85 percent by weight. Particularly suitable polybutadiene homopolymer latexes are SR-6920 (Firestone Tire & Rubber Co.) and Gentac 8029 (General Tire & Rubber Co.).

The butadiene-styrene-vinylpyridine terpolymer can also be introduced into the composition as an aqueous latex emulsified with a synthetic anionic surfactant having sulfate, sulfonate or sulfosuccinate groups. Such surfactants are well-known in the polymer emulsion art and a large number are commercially available. It is preferable that the polybutadiene homopolymer and the butadiene-styrene-vinylpyridine terpolymer latexes be formed directly by emulsion polymerization according to well-known procedures employing surfactants of the type called for. Such a latex will ordinarily contain about 30 to 50 percent by weight of non-volatile material and preferably the terpolymer therein will have been formed by emulsion polymerization. Preferably, the gel content of the terpolymer will be at least about 60 percent by weight thereof and also preferably not greater than about 85 percent by weight. Preferably, the terpolymer will comprise, by weight thereof, about 60-80 percent butadiene, about 10-25 percent styrene and about 5-20 percent vinyl pyridine. Even more preferably it will comprise about 65-75 percent butadiene, about 17-21 percent styrene and about 9-13 percent vinylpyridine. Particularly suitable terpolymer latexes are Gentac 130 and Gentac 135 (General Tire & Rubber Company).

While the relative proportions of these two components can vary considerably, it has been found preferable to have them present in a weight ratio of about 2 to about 5 parts polybutadine homopolymer to 1 part terpolymer and more preferably about 3 to about 4 parts homopolymer to 1 part terpolymer.

The resorcinol-formaldehyde resin can be a water-soluble condensate of the type conventionally used in tire cord impregnating compositions. Ordinarily such resins are produced by condensing about 0.2 to about 0.8 mole of formaldehyde with 1 mole of resorcinol. A small amount of additional formaldehyde can also be incorporated into the impregnating composition. Suitable resorcinol-formaldehyde resins are SRF 1524 (Schenectady Chemical Co.), Penacolite R2170 and 2220 (Koppers Co.) and Arofene 779 (Ashland Chemical Co.).

The emulsified wax can be supplied as an emulsion. The nature of the wax is not critical, but a mixture of about 3 parts paraffin wax to about 1 part microcrystalline wax has been found particularly suitable. Vultex Wax Emulsion No. 15 (General Latex and Chemical Co.) is a suitable wax emulsion.

Conventional thickening and defoaming agents can be used. Many such materials are known, but the commercially available formulations are typically complex mixtures whose compositions are neither disclosed nor readily determinable. Among the suitable thickening agents are Tychem 9509 and Alco L-21. Among the suitable defoaming agents are Drew Y-250 and Quaker MRL-1.

While the relative proportions of these components may vary considerably, it has been found preferable to employ the following relative proportions by weight of the enumerated components:

| | |
|---|---|
| 50-80% | polybutadiene homopolymer, |
| 15-25% | terpolymer, |
| 2-10% | resorcinol-formaldehyde resin, |
| 2-12% | wax, |
| 0.05-1% | thickening agent and |
| 0.2-2% | defoaming agent. |

The total amount of non-volatile components in the aqueous impregnating composition can vary widely, but from about 30 to about 60 percent by weight has been found convenient and is preferred. Minor amounts of KOH and/or ammonia can also be incorporated, the pH of the aqueous impregnating composition being preferably from about 8 to about 11 and more preferably from about 9 to about 11.

The following examples describe specific preferred embodiments of the invention.

Example 1

| Component | | A | | C | |
|---|---|---|---|---|---|
| | | Wt. % (Wet) | Wt. % (Dry) | Wt. % (Wet) | Wt. % (Dry) |
| SR-6929 | 45% | 61.75 | 66.2 | | |
| Gentac 8029 | 51% | | | 61.87 | 68.4 |
| Gentac 130 | 41% | 20.54 | 20.1 | | |
| Gentac 135 | 41% | | | 20.64 | 18.3 |
| SRF 1524 | 75% | 3.03 | 5.4 | 3.05 | 5.0 |
| Wax Emulsion | ~55% | 4.87 | 6.4 | 4.89 | 6.5 |
| Alco L-21 | 10% | 1.24 | 0.3 | | |
| Tychem 9509 | 10% | | | 0.54 | 0.1 |
| Quaker MRL-1 | | 0.25 | 0.6 | 0.38 | 0.8 |
| KOH | 45% | 0.17 | 0.2 | 0.17 | 0.2 |
| NH4OH | 26° Be | 0.92 | — | 0.93 | — |
| Formaldehyde | 37% | 0.90 | 0.8 | 0.91 | 0.7 |
| Water | | Balance | | Balance | |

To a first mixing tank, charge successively the polybutadiene latex, the ammonium hydroxide, the terpolymer latex and the wax emulsion while maintaining gentle agitation. In a second tank, form a premix by charging successively about half of the deionized water, the resorcinol-formaldehyde latex or solution, and the formaldehyde with gentle agitation, continue agitation for about 1 hour and then charge the balance of the deionized water and the KOH solution while maintaining the agitation. After about 20 minutes from the beginning of KOH addition, charge this premix quickly into the first tank with vigorous agitation and continue agitation for about 15 minutes. Then slowly charge the thickener, continuing the vigorous agitation for about another 45 minutes, and finally charge the defoamer, continuing the agitation for a further period of about 15 minutes. This aqueous impregnating composition should preferably be aged for about 2 days with minimum contact with air (in order to minimize skinning) before use. Typically and preferably, these mixtures will have solids content of about 41.5-43.5 percent by weight, pH from about 9-10 percent and a Brookfield viscosity (RVF #2 at 20 rpm) of about 100-800 cps.

Multifilament glass strand suitable for the ultimate use intended can be impregnated with the aqueous impregnating compositions of this invention by immersing the strand in a body of the liquid impregnating composition so as to substantially saturate the strand therewith. Such saturation can be facilitated by drawing the strand across one or more bars or rollers during immersion in order to splay or separate the individual filaments slightly. Other application procedures such as spraying or curtain coating or roll coating can also be employed. The loading of aqueous impregnating composition, and the corresponding loading of dried and partially cured impregnant, in the strand can be readily controlled by drawing the saturated strand through a wiping die of suitable cross-section. A final loading of impregnant of about 15-25 percent, based on the weight of glass fiber, is typical and preferred, although more or less than this may be desirable in some circumstances. The wet strand is ordinarily air dried and then at least partially cured by heating at about 500°-650° F. for about 5-10 seconds.

Those skilled in the art will recognize that many variations and modifications of the invention are possible and these are considered to be within the scope of the invention as described.

We claim:

1. In an aqueous composition for impregnating multifilament glass strand with an elastomer-compatible impregnant, said aqueous composition comprising emulsified polybutadiene homopolymer, emulsified butadiene-styrene-vinylpyridine terpolymer, resorcinol-formaldehyde resin, emulsified wax, a thickening agent and a defoaming agent, the improvement for reducing rub-off of said impregnant from said strand impregnated therewith, while retaining desirably low tackiness of said impregnant, which comprises employing synthetic anionic surfactant having sulfate, sulfonate or sulfosuccinate groups as emulsifying agent for said homopolymer and for said terpolymer.

2. An aqueous composition according to claim 1 wherein said homopolymer and said terpolymer each has a gel content of at least about 60 percent by weight.

3. An aqueous composition according to claim 1 wherein said terpolymer comprises by weight about 60-80 percent butadiene, about 10-25 percent styrene and about 5-20 percent vinyl pyridine.

4. An aqueous composition according to claim 1 wherein the weight ratio of said homopolymer to said terpolymer is about 3:1 to about 4:1.

5. An aqueous composition according to claim 1 wherein the approximate relative proportions by weight of the enumerated components are 50-80 percent homopolymer, 15-25 percent terpolymer, 2-10 percent resorcinol-formaldehyde resin, 2-12 percent wax, 0.05-1 percent thickening agent and 0.2-2 percent defoaming agent and the total amount of non-volatile components is approximately 30-60 percent by weight of said aqueous composition.

6. In a method for impregnating multifilament glass strand with an elastomer-compatible impregnant, which method comprises providing a body of an aqueous composition which aqueous composition comprises emulsified polybutadiene homopolyer, emulsified butadiene-styrene-vinylpyridine terpolymer, resorcinol-formaldehyde resin, emulsified wax, a thickening agent and a defoaming agent; immersing said multifilament glass strand in said body of aqueous composition to substantially saturate said multifilament glass strand with said aqueous composition; and heating the saturated multifilament glass strand to substantially remove water from the aqueous composition saturating said saturated strand and to at least partially cure the residue thereof so as to form said elastomer-compatible impregnant impregnating said multifilament glass strand; the improvement for reducing rub-off of said impregnant from the impregnated glass strand, while retaining desirably low tackiness of said impregnant, which comprises employing synthetic anionic surfactant having sulfate, sulfonate or sulfosuccinate groups as emulsifying agent for said homopolymer and said terpolymer.

7. A method according to claim 6 wherein said homopolymer and said terpolymer each has a gel content of at least about 60 percent by weight.

8. A method according to claim 6 wherein said terpolymer comprises by weight about 60-80 percent butadiene, about 10-25 percent styrene and about 5-20 percent vinyl pyridine.

9. A method according to claim 6 wherein the weight ratio of said homopolymer to said terpolymer is about 3:1 to about 4:1.

10. A method according to claim 6 wherein the approximate relative proportions by weight of the enumerated components in said aqueous composition are 50-80 percent homopolymer, 15-25 percent terpolymer, 2-10 percent resorcinol-formaldehyde resin, 2-12 percent wax, 0.05-1 percent thickening agent and 0.2-2 percent defoaming agent and the total amount of non-volatile components in said aqueous composition is approximately 30-60 percent by weight of said aqueous composition.

* * * * *